United States Patent
Senyk et al.

(10) Patent No.: US 8,701,747 B2
(45) Date of Patent: *Apr. 22, 2014

(54) METHOD AND AN APPARATUS FOR COOLING A COMPUTER

(75) Inventors: Borys S. Senyk, San Jose, CA (US); Larry L. Moresco, Eagle, ID (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,739

(22) Filed: Sep. 13, 2011

(65) Prior Publication Data

US 2012/0000640 A1   Jan. 5, 2012

Related U.S. Application Data

(63) Continuation of application No. 12/372,660, filed on Feb. 17, 2009, now Pat. No. 8,016,023, which is a continuation of application No. 11/395,900, filed on Mar. 30, 2006, now Pat. No. 7,490,656, which is a continuation of application No. 09/607,871, filed on Jun. 30, 2000, now Pat. No. 7,086,452.

(51) Int. Cl.
  *G05D 23/00*   (2006.01)
  *F28D 15/00*   (2006.01)
  *F22B 37/00*   (2006.01)
  *H05K 7/20*   (2006.01)

(52) U.S. Cl.
  USPC ............... 165/11.1; 165/104.33; 165/287; 361/689; 361/699

(58) Field of Classification Search
  USPC ........... 165/11.1, 104.33, 287, 288, 289, 290; 361/687, 689, 699, 697, 700
  See application file for complete search history.

(56) References Cited

U.S. PATENT DOCUMENTS

| | | |
|---|---|---|
| 3,724,536 A | 4/1973 | Baxter |
| 4,915,167 A | 4/1990 | Altoz |
| 5,034,688 A | 7/1991 | Moulene et al. |
| 5,121,291 A | 6/1992 | Cope et al. |
| 5,198,189 A | 3/1993 | Booth et al. |
| 5,323,294 A | 6/1994 | Layton et al. |
| 5,333,676 A | 8/1994 | Mizuno |
| 5,441,102 A | 8/1995 | Burward-Hoy |
| 5,513,361 A | 4/1996 | Young |

(Continued)

FOREIGN PATENT DOCUMENTS

CN    296083    1/1997

OTHER PUBLICATIONS

Intel Corporation, Non-Final Office Action dated Aug. 10, 2007, U.S. Appl. No. 11/395,900, Whole Document.
Intel Corporation, Final Office Action dated Feb. 25, 2008, U.S. Appl. No. 11/395,900, Whole Document.

(Continued)

*Primary Examiner* — Ljiljana Ciric
(74) *Attorney, Agent, or Firm* — Blakely, Sokoloff, Taylor & Zafman LLP (57) ABSTRACT

A heat exchanging system comprising circulating fluid through a tube coupled to an electronic component in a first part of a computing device and to a heat transfer plate in a second part of the computing device.

6 Claims, 10 Drawing Sheets

(56) References Cited

U.S. PATENT DOCUMENTS

| | | | |
|---|---|---|---|
| 5,535,818 | A | 7/1996 | Fujisaki et al. |
| 5,588,483 | A | 12/1996 | Ishida |
| 5,606,341 | A | 2/1997 | Aguilera |
| 5,646,822 | A | 7/1997 | Bhatia et al. |
| 5,718,282 | A | 2/1998 | Bhatia et al. |
| 5,757,615 | A | 5/1998 | Donahoe et al. |
| 5,764,483 | A | 6/1998 | Ohashi et al. |
| 5,880,929 | A | 3/1999 | Bhatia |
| 5,966,286 | A | 10/1999 | O'Connor et al. |
| 6,026,896 | A | 2/2000 | Hunter |
| 6,047,766 | A | 4/2000 | Van Brocklin et al. |
| 6,097,597 | A | 8/2000 | Kobayashi |
| 6,125,035 | A | 9/2000 | Hood, III et al. |
| 6,166,907 | A | 12/2000 | Chien |
| 6,191,546 | B1 | 2/2001 | Bausch et al. |
| 6,196,003 | B1 | 3/2001 | Macias et al. |
| 6,226,178 | B1 | 5/2001 | Broder et al. |
| 6,255,622 | B1 | 7/2001 | May et al. |
| 6,288,371 | B1 | 9/2001 | Hamilton et al. |
| 7,086,452 | B1 * | 8/2006 | Senyk et al. ............ 165/104.33 |
| 7,490,656 | B2 * | 2/2009 | Senyk et al. ............... 165/11.1 |

OTHER PUBLICATIONS

Intel Corporation, Non-Final Office Action dated Jun. 26, 2001, U.S. Appl. No. 09/607,871, Whole Document.
Intel Corporation, Final Office Action dated Dec. 18, 2001, U.S. Appl. No. 09/607,871, Whole Document.
Intel Corporation, Non-Final Office Action dated May 8, 2002, U.S. Appl. No. 09/607,871, Whole Document.
Intel Corporation, Non-Final Office Action dated Nov. 6, 2002, U.S. Appl. No. 09/607,871, Whole Document.
Intel Corporation, Non-Final Office Action dated Jul. 9, 2003, U.S. Appl. No. 09/607,871, Whole Document.
Intel Corporation, Final Office Action dated Aug. 20, 2003, U.S. Appl. No. 09/607,871, Whole Document.
Intel Corporation, Non-Final Office Action dated Mar. 29, 2005, U.S. Appl. No. 09/607,871, Whole Document.
Intel Corporation, Final Office Action dated Aug. 11, 2005, U.S. Appl. No. 09/607,871, Whole Document.
Intel Corporation, Non-Final Office Action dated Jul. 23, 2010 for U.S. Appl. No. 12/372,660, 10 pages.
Intel Corporation, Final Office Action dated Jan. 24, 2011 for U.S. Appl. No. 12/372,660, 7 pages.

* cited by examiner

115 may be secured to computer system 100. Mechanical means may be used such as welding or soldering the tube to various heat spreaders and heat transfer plate, a stand off and clamps, or clips that surround tube 115 and attach to the base of computer system 110.

Figure 1:
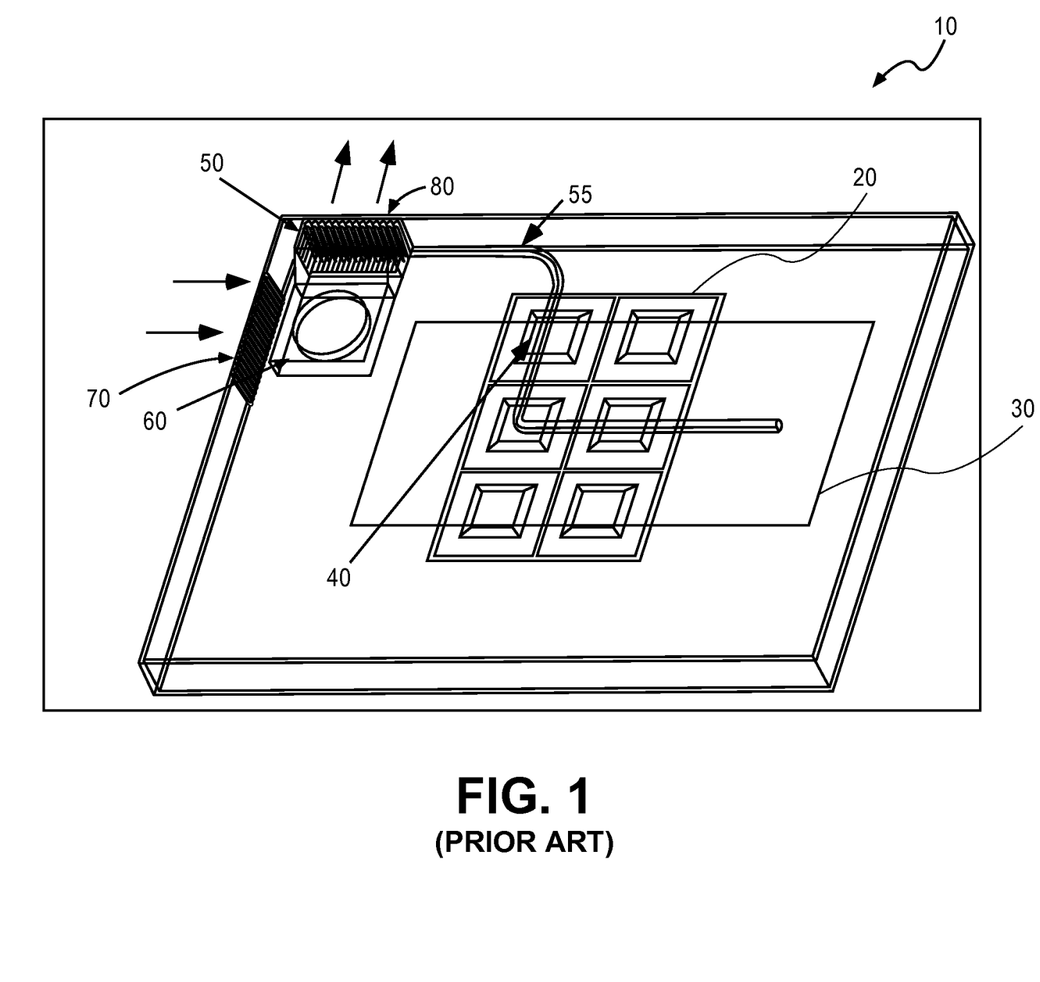
Figure 2:
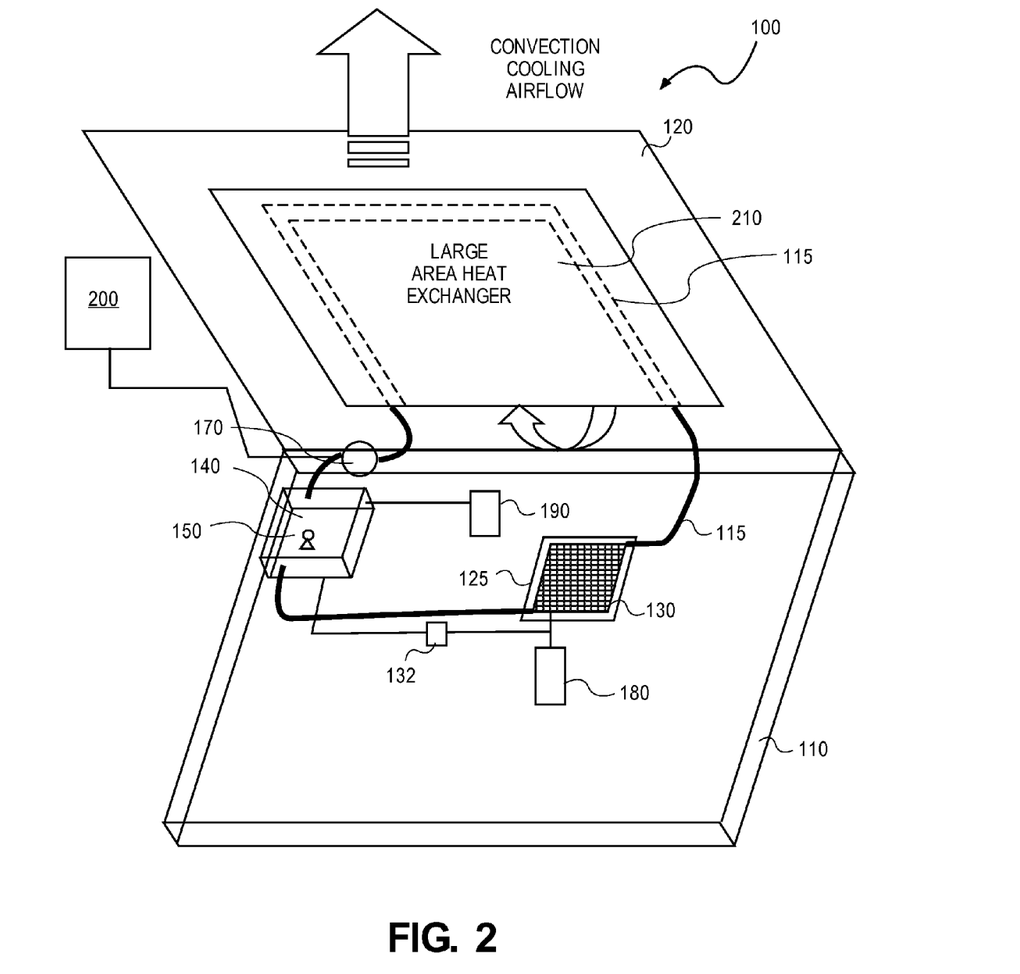

There are also numerous ways in which tube 115 may be arranged relative to heat transfer plate 125 in first part 110 and heat transfer plate 210 (also referred to herein as the second heat transfer plate) in second part 120 of computing system 100 to remove heat generated by computer system 100 in the range of 10 watts to 50 watts. FIG. 2 illustrates one such arrangement. Tube 115 is coupled to fluid container 140 which contains the fluid that is pumped by pump 150 at a rate of about 1 milliliter per second ("ml/sec") to 10 ml/sec through tube 115. Fluid container 140 generally has a volume that ranges from about 10 cubic centimeters ("$cm^3$") to 25 $cm^3$. The fluid contained within tube 115 may range from 25 ml to 250 ml. The thermal cooling capability is directly proportional to the mass flow rate of the cooling medium removing heat from the heat generation source to a heat rejection point such as a heat transfer plate. As a result, the amount of fluid pumped through tube 115 may increase or decrease the amount of cooling that occurs to microprocessor 130. One skilled in the art, therefore, may adjust the mass flow rate by modifying the design parameters such as the length or the diameter of tube 115 in order to increase or decrease the rate of cooling.

Temperature sensor 180 is coupled to fluid container 140, pump 150, and to power management system 132. Temperature sensor 180 is able to sense the temperature of microprocessor 130 when microprocessor 130 reaches a threshold level such as in the range of 70 to 100 Celsius that requires the cooling system to be activated in order to cool computer system 100. The cooling system is activated when temperature sensor 180 sends a signal to power management system 132 indicating that a threshold temperature has been reached by microprocessor 130. Power management system 132 controls operating conditions of the cooling system for computing device 100 such as the cooling fluid pumping rate. Power management system 132 may include memory or be coupled to a memory device. Memory may include read only memory ("ROM"), random access memory ("RAM"), magnetic disk storage media, optical storage media, flash memory devices, and/or other machine-readable media. Using program instructions stored within power management system 132 or in any other suitable location such as the chip set (not shown) of computer system 100, power management system 132 controls the cooling system by then sending a signal to pump 150 to start pumping fluid from fluid container 140. Once the temperature of microprocessor 130 is below the threshold temperature, power management system 132 sends another signal to pump 150 to stop pumping fluid from fluid container 150.

Fluid sensor 190 is also coupled to fluid container 140 and to power management system 132. Fluid sensor 190 is configured in such a manner to detect when the fluid contained in fluid container 140 reaches a level that requires fluid to be added to fluid container 140. If the fluid in fluid container 140 is low, fluid sensor 190 sends a signal to power management system 132. This indicates to power management system 132 that pump 150 should stop pumping. Power management system 132 may also send a signal to the graphic user interface of computer system 100 that the fluid is low in fluid container 140.

Figure 3:
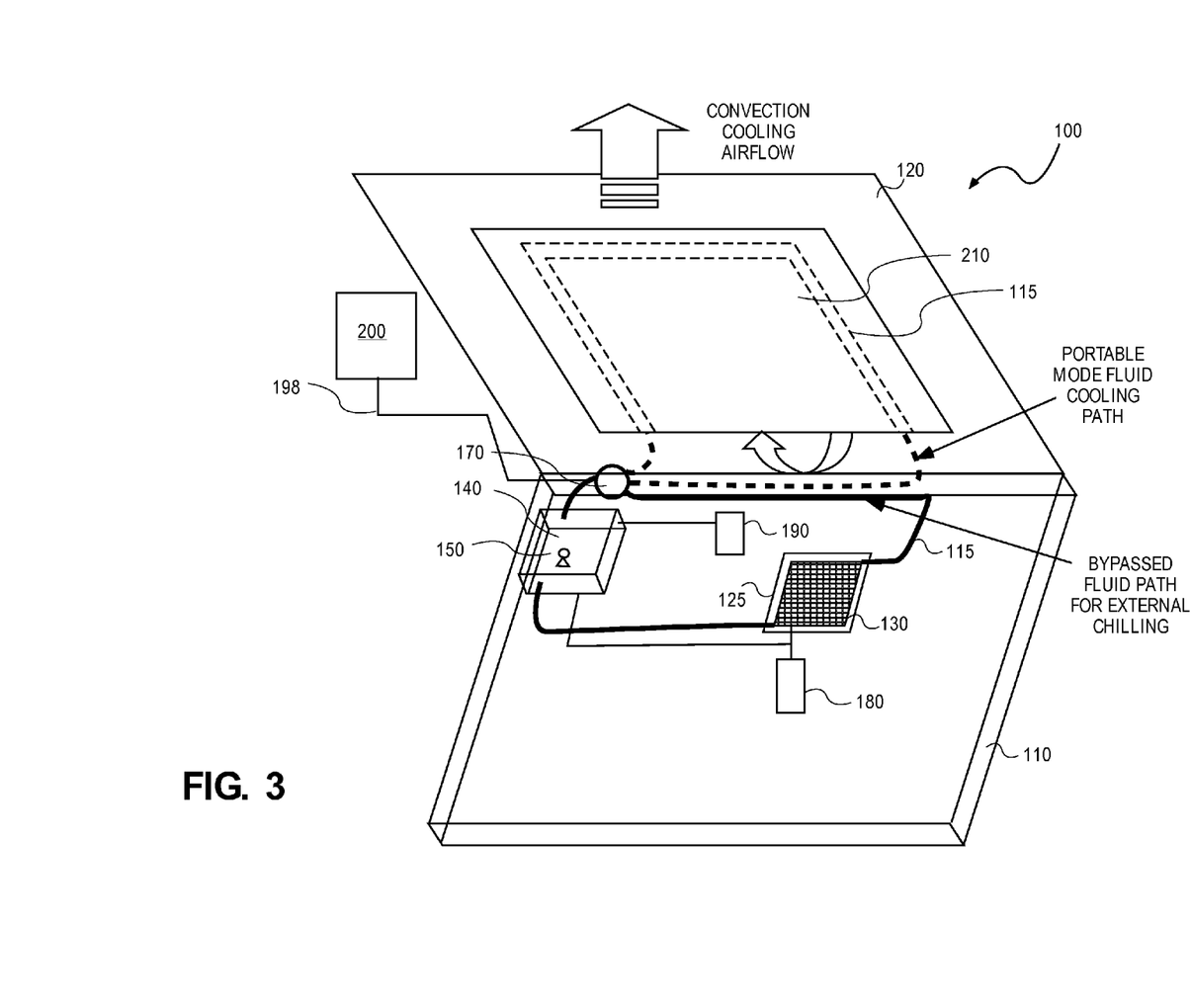

Tube 115 is also coupled to coupling disconnect 170 which allows a user to detach tube 115 and couple tube 115 to an externally supplied chilled fluid or a fluid that is capable of reducing heat generated from microprocessor 130. This externally supplied fluid is stored and pumped by the external cooling loop inside container 200. Coupling disconnect 170 may be used to either augment the existing cooling system or disable a portion of the closed loop system formed by tube 115. FIG. 3 illustrates one such path of the fluid when the coupling disconnect 170 is used in conjunction with externally supplied fluid stored in container 200.

Thereafter, tube 115 is connected to heat transfer plate 125 such as a plate-fin type liquid heat transfer plate that is located near microprocessor 130 in the first part 110 of computer system 100. Plate-fin type liquid heat transfer plates utilize plates or fins that serve as heat-transfer surfaces and a frame to support the plates or fins. Heat-transfer plates generally comprise copper, aluminum, or stainless steel, but titanium, nickel, monel, Incoloy 825, Hastelloy C, phosphor bronze and cupronickel may also be used. Heat transfer plates or fins induce turbulence in the fluids and assure more efficient heat transfer and complete flow distribution. The cooling fluid passes through tube 115 and into one side of the heat transfer plate 125. As the cooler fluid passes through heat transfer plate 125 and through a plurality of heat transfer fins 360 shown in FIGS. 6 and 7, heat is exchanged from the metal surfaces of the heat transfer plate to the cooling fluid.

After the heat is exchanged through heat transfer plate 125 which results in cooling microprocessor 130, the fluid in tube 115 travels through the remainder of first part 110 and enters second part 120 of computing device 100. The fluid follows the path of tube 115 in a vertical direction relative to first part 110 of computing device 100. In the top portion of second part 120, the fluid travels in a generally horizontal direction and then in a downward direction of second part 120 of computing device 100. The fluid then exits second part 120 and enters coupling disconnect 170 and passes back into fluid container 140. The cycle then repeats until microprocessor 130 is properly cooled to a temperature that is generally designated by the manufacturer of the computer system such as in the range of 70 to 100 Celsius. Alternatively, the fluid may be pumped in the reverse direction of the path described above.

Figure 4:
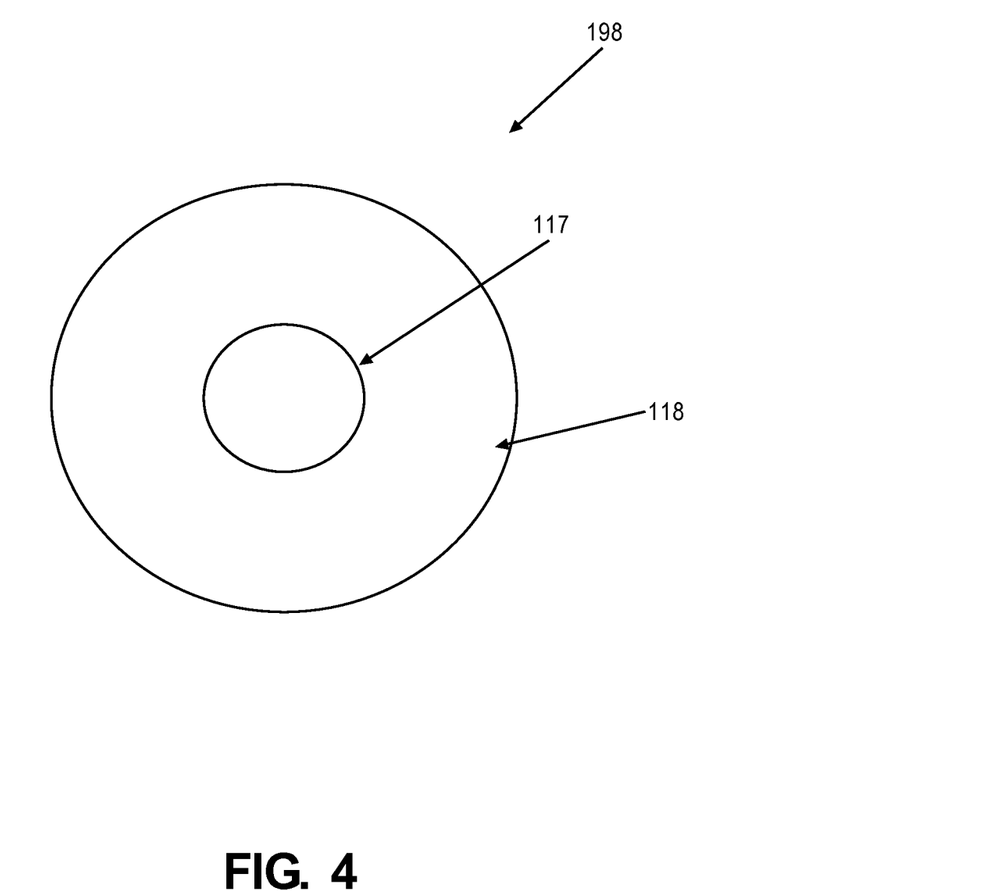
Figure 5:
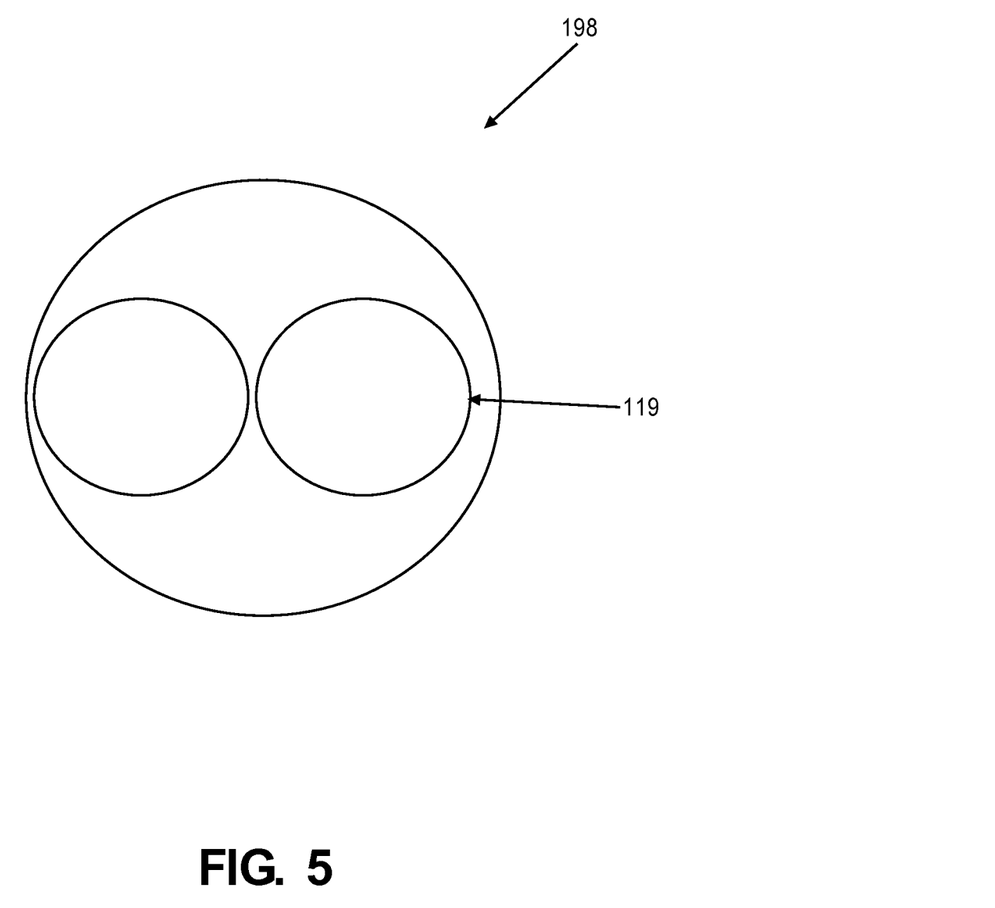

In yet another embodiment of the invention, a different path of the fluid flow is shown in FIG. 3. Coupling disconnect 170 is connected to an externally chilled fluid source such as container 200. The externally chilled fluid provides another route for the fluid to flow through computing device 100. The fluid passes through fluid container 140 and travels beneath or around microprocessor 130 and through heat transfer plate 125. The fluid exits tube 115 returning the fluid to container 200 through tube 198. FIGS. 4-5 illustrate cross-sectional views of bi-directional tube 198 shown in FIG. 3 that allows cooling fluid to be transported to computing device 100 through a portion of tube 198 connected to container 200 and the fluid that has completed its path through the cooling system is returned to container 200 through another portion of bi-directional tube 198. For example, FIG. 4 illustrates a cross-sectional view of bi-directional tube 198 in which cooling fluid travels toward computing device through inner tube 117 and the fluid is returned to container 200 for chilling through tube 118. Alternatively, FIG. 5 illustrates dual tubes 119 in tandem. One tube is for allowing chilled fluid to be transported to the computing device 100 and the other tube allows the fluid to be returned to container 200. In another embodiment, some other container (not shown) may be used to store the fluid that has been used to cool computing device 100.

In yet another embodiment, the fluid does not bypass heat transfer plate 210. Instead, after the fluid travels beneath or around microprocessor 130, the fluid exits the first part 110 and enters the second part 120 of computing system 100. The fluid then travels through heat transfer plate 210 of second part 120 of computing device 100. Thereafter, the fluid exits tube 115 and enters container 200 or some other container (not shown).

In another embodiment, the fluid may flow in the reverse path. For example, the fluid may be pumped from container 200 to coupling disconnect 170. From coupling disconnect 170, the fluid enters tube 115 and begins to travel through second part 120 of computing device 100 following the path defined by tube 115. The fluid exits second part 120 of computing device 100 and enters first part 110 of computing device 100. The fluid travels beneath or near microprocessor 130 and then enters fluid container 140. The fluid exits fluid container 140 and then enters container 200. This external cooling system may be located in a variety of places such as a docking station, an alternating current battery charger brick, or some other suitable location.

Figure 6:
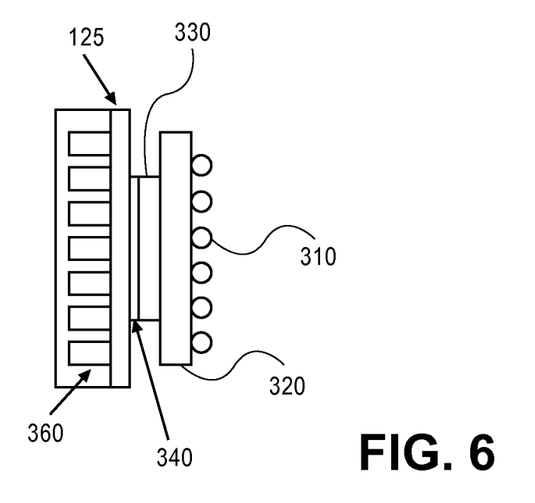
Figure 7:
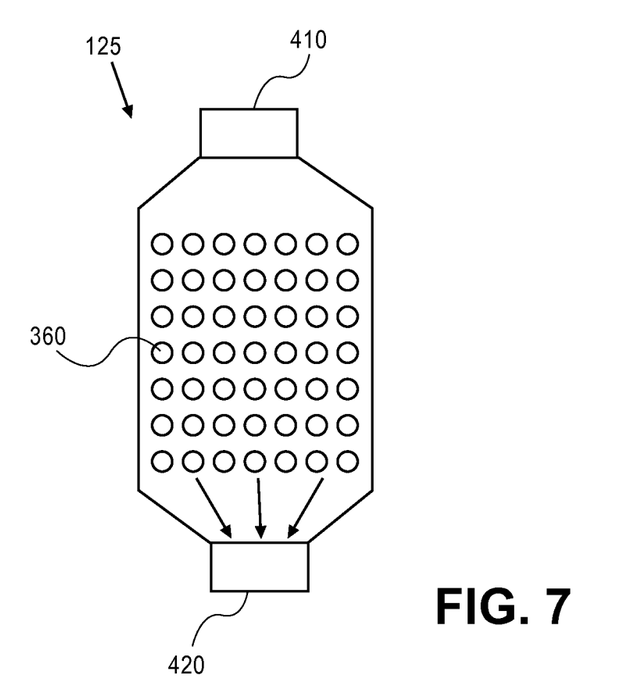
Figure 8:
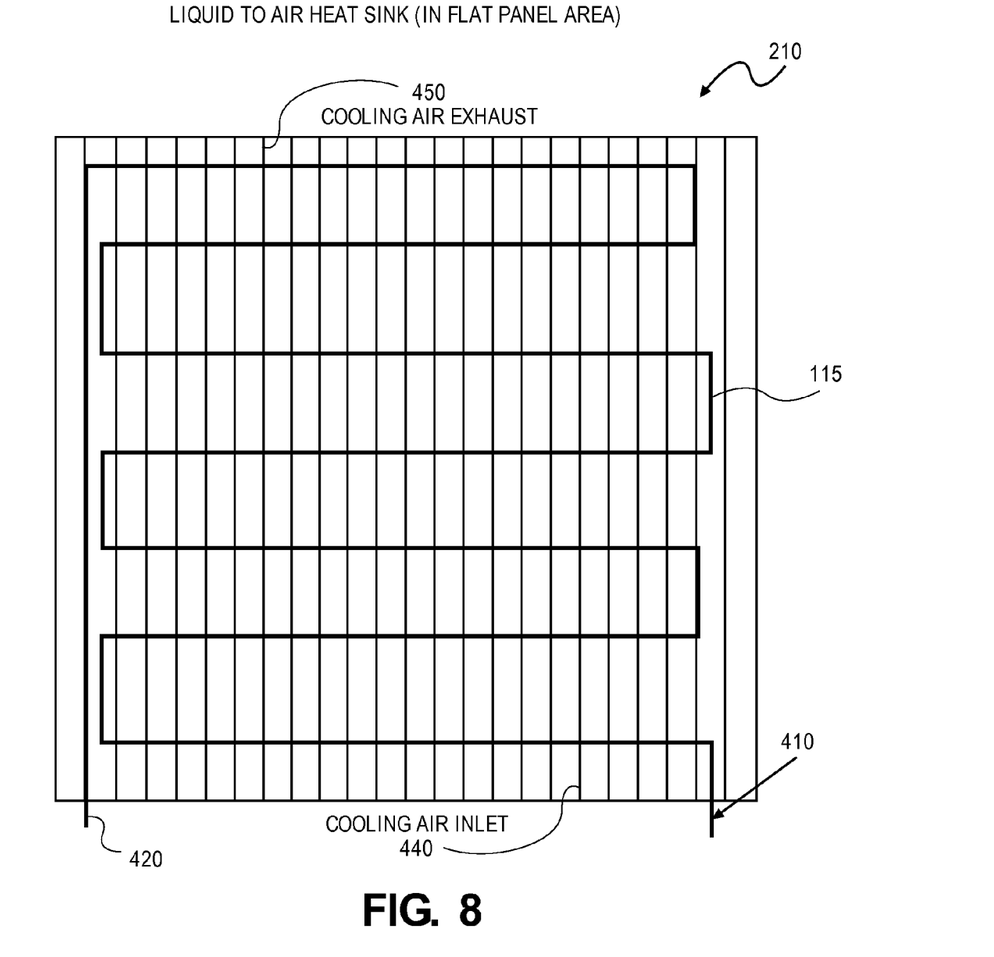

FIGS. 6-8 show enlarged views of the first and second heat transfer plates (125, 210). FIG. 6 illustrates a cross-sectional view of the heat transfer system for first heat transfer plate 125. Solder balls 310 are connected to integrated circuit package 320 which is further coupled to integrated circuit 330. Thermal bond line 340 acts as a conductive adhesive between integrated circuit 330 and first heat transfer plate 125. Thermal bond line 340 may include materials such as grease, epoxy, elastomeric material, graphite, or any other suitable material. First heat transfer plate 125 is connected to a plurality of heat sink pin fins 360.

FIG. 7 illustrates a top view of first heat transfer plate 125. The heat generated from integrated circuit 330 is transferred through thermal bond line 340 to first heat transfer plate 125 and heat sink pin fins 360. Fluid from tube 115 enters inlet 410 and passes over first heat transfer plate 125 and into heat sink pin fins 360. The fluid has a turbulent flow through heat sink pin fins 360 which causes the fluid to have longer contact with first heat transfer plate 125 and heat sink pin fins 360. The heat is transferred from first heat transfer plate 125 and heat sink pin fins 360 to the fluid which exits first heat transfer plate 125 through outlet 420 and reenters tube 115.

FIG. 8 illustrates a top view of second heat transfer plate 210 that is located in second part 120 of computing device 100. Second heat transfer plate 210 has a large surface area that allows heat to be transferred to ambient air through conduction and convection. Tube 115 is arranged to have a plurality of passes in second part 120 of computing device 100 in order to take advantage of the large surface area of second heat transfer plate 210. Fluid enters inlet 410 and follows the path of tube 115 and exits outlet 420. In addition, air passes through air inlet 440, travels across heat transfer plate 115 and exits air outlet 450 which also serves to cool computer system 100.

Figure 9:
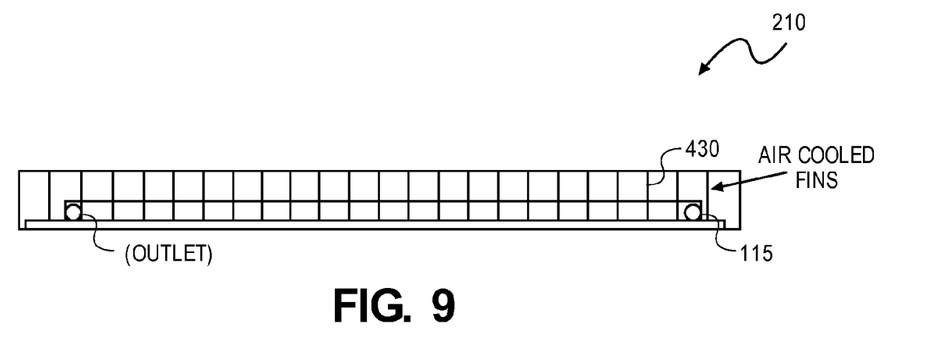

FIG. 9 illustrates a cross-sectional view of second heat transfer plate 210. A plurality of fins 430 are located perpendicular to display 444. Fins 430 are air cooled as described above which provides greater heat transfer from tube 115 and the ambient air.

Figure 10:
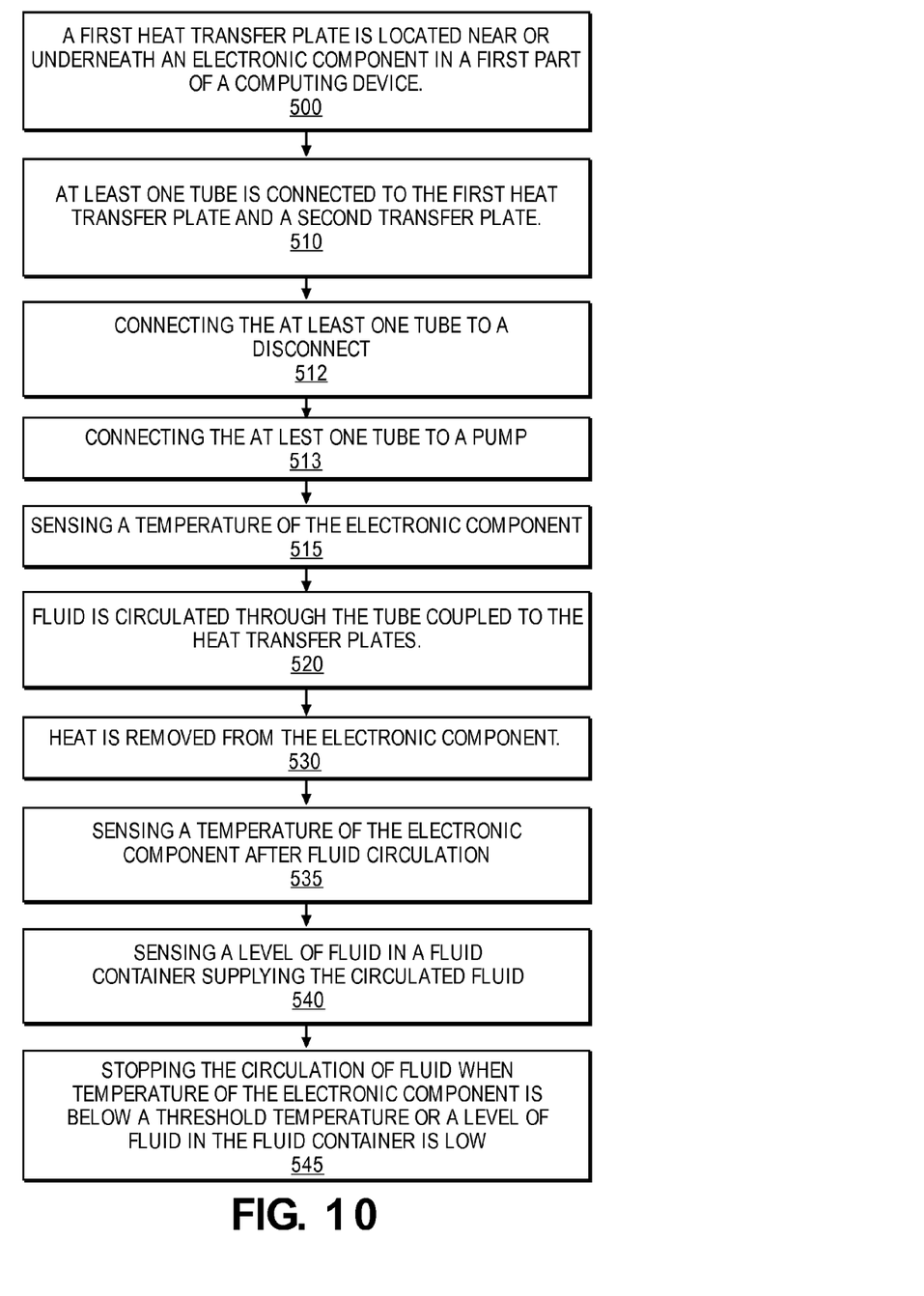

FIG. 10 illustrates a flow diagram of one embodiment of the invention. At block 500, a first heat transfer plate is located near or underneath an electronic component in a first part of a computing device. At block 510, at least one tube is coupled to a first heat transfer plate and a second heat transfer plate. The tube that is connected to the first transfer plate may be made of one material such as plastic whereas the tube connected to the second heat transfer plate may comprise another material such as metal. Alternatively, the tube may be made of the same material. At block 520, fluid is circulated through the tube coupled to the first heat transfer plate and to the second heat transfer plate. At block 530, heat is removed from the electronic component.

Figure 11:
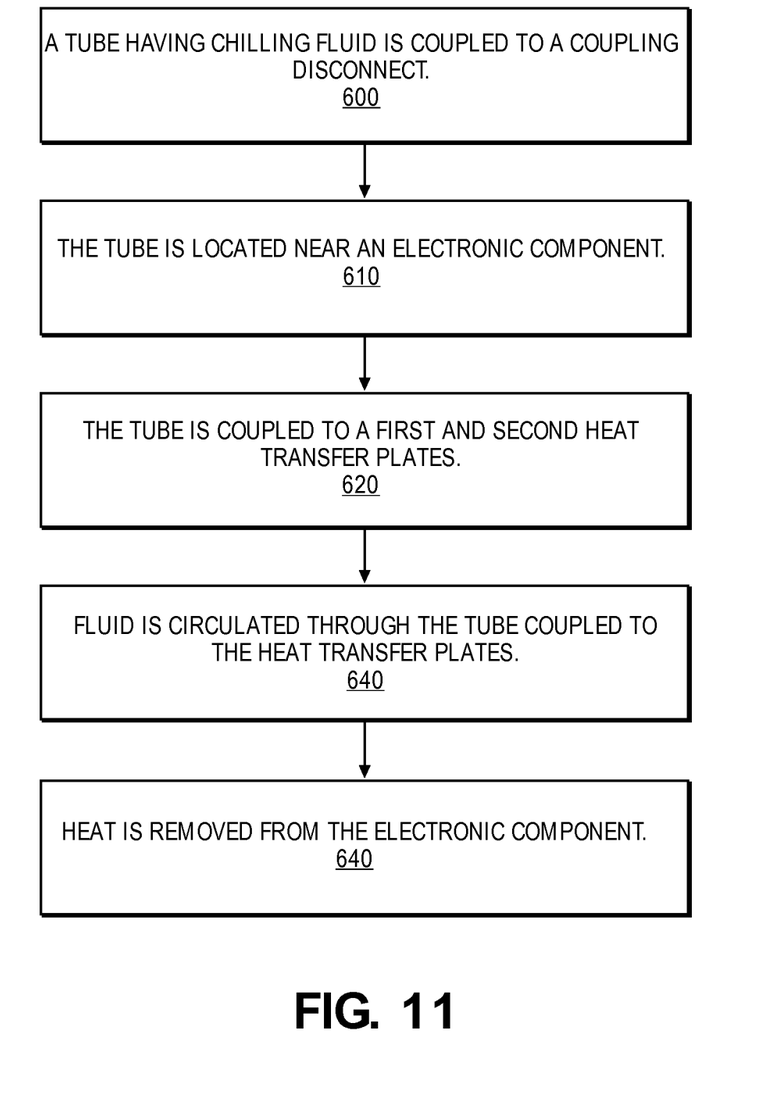

FIG. 11 illustrates a flow diagram in which chilled fluid is supplied to the computing device. At block 600, a tube having chilled fluid is coupled to a coupling disconnect. At block 610, the tube is located near an electronic component such as microprocessor. At block 620, the tube is coupled to a first heat transfer plate and a second heat transfer plate. At block 630, fluid is circulated through the tube coupled to the first and second heat transfer plates. At block 640, heat is removed from the electronic component.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
    a heat generating element and a first heat transfer plate disposed in a first part of a portable computing device;
    a second heat transfer plate disposed in a second part of the portable computing device;
    a tube coupled to the first part and the second part of the portable computing device; and
    a sensor configured to sense a threshold temperature of the heat generating element.

2. The apparatus of claim 1, wherein the heat generating element comprises a motherboard and the first part of the portable computing device comprises a housing for the motherboard and the second part comprises a housing for a display.

3. The apparatus of claim 1, further comprising a container and a pump configured to circulate a fluid through the tube.

4. The apparatus of claim 1, further comprising a pump coupled to the tube.

5. The apparatus of claim 1, wherein the heat generating element comprises a microprocessor.

6. The apparatus of claim 1, wherein the tube comprises a stainless steel tube.

* * * * *